Apr. 3, 1923.
G. ZILOCCKI
1,450,536
REVERSING MECHANISM FOR DRIVE SHAFTS
Filed Nov. 1, 1921
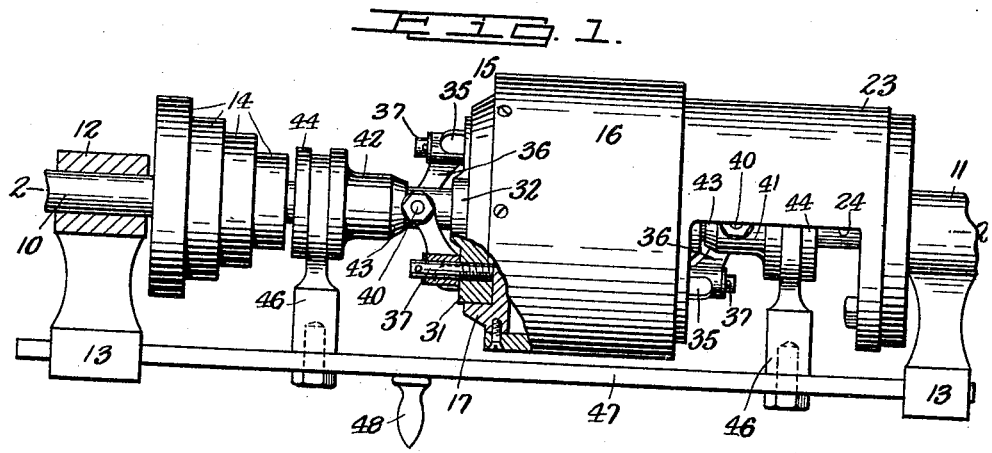
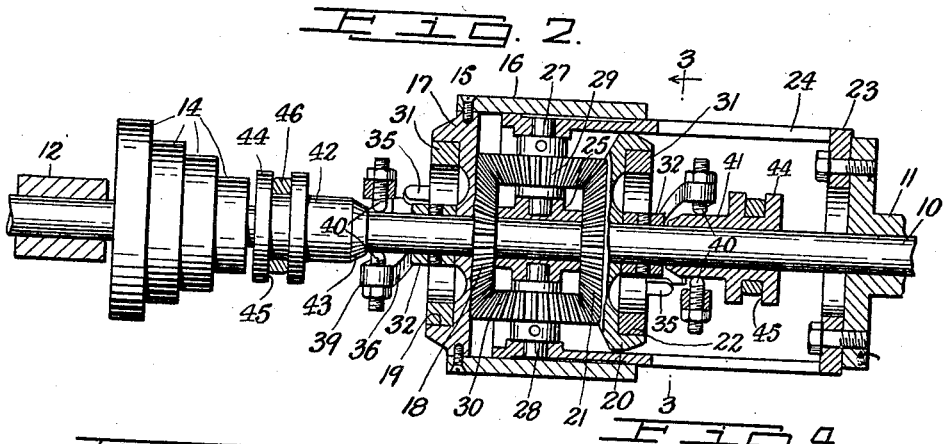
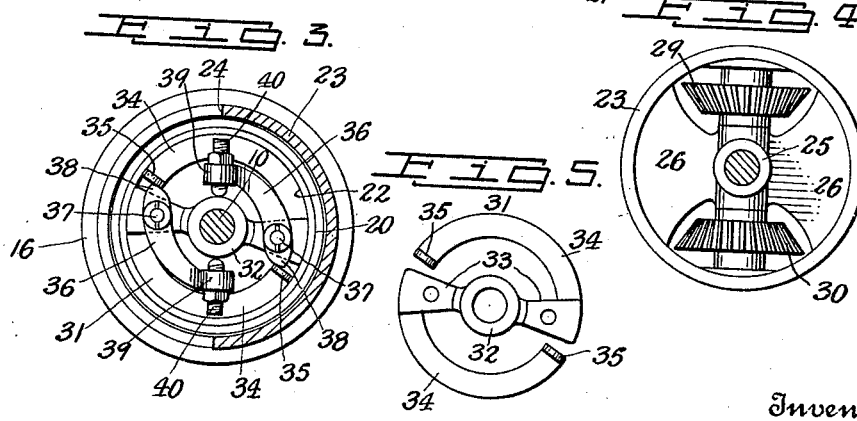
Inventor
Giordano Zilocchi
By his Attorneys
Edgar Date &Co Patented Apr. 3, 1923.

1,450,536

UNITED STATES PATENT OFFICE.

GIORDANO ZILOCCKI, OF GRANTON, NEW JERSEY, ASSIGNOR OF THIRTY PER CENT TO NICHOLAS PARTENOPE, OF WEST NEW YORK, NEW JERSEY.

REVERSING MECHANISM FOR DRIVE SHAFTS.

Application filed November 1, 1921. Serial No. 511,980.

*To all whom it may concern:*

Be it known that I, GIORDANO ZILOCCKI, a citizen of Italy, and residing at Granton, in the county of Hudson and State of New Jersey, have invented certain new and useful Improvements in Reversing Mechanisms for Drive Shafts, of which the following is a specification, such as will enable those skilled in the art to which it appertains to make and use the same.

This invention relates to drive or power shafts of various kinds and classes, such for example, as the power shafts of shop machinery and other machinery or mechanisms of this class, and the object of the invention is to provide a simple and effective mechanism mounted in connection with or cooperating with the drive or power shafts of machines of apparatus of the class specified which is adapted to rotate said shaft in opposite directions; a further object being to provide frictional or clutch means for controlling the direction in which the shaft is to be rotated; and with these and other objects in view the invention consists in a reversing mechanism of the class specified which is simple in construction and operation and efficient in use and which is constructed and operated as hereinafter described and claimed.

The invention is fully disclosed in the following specification, of which the accompanying drawing forms a part, in which the separate parts of my improvement are designated by suitable reference characters in each of the views, and in which:—

Fig. 1 is a plan view of a power shaft of any kind or class showing my improved reversing mechanism mounted in connection therewith, with parts of the construction broken away and in section;

Fig. 2 a partial section on the line 2—2 of Fig. 1;

Fig. 3 a partial section on the line 3—3 of Fig. 2;

Fig. 4 an end view of a drum which I employ showing the method of mounting two beveled gears in connection therewith; and, Fig. 5 a detail view of a friction or clutch member, two of which are employed.

For the purpose of illustrating one use of my invention, I have shown in the accompanying drawing a power or drive shaft 10 of any kind or class, or used for any purpose, and this shaft is mounted in suitable bearings 11 and 12 having forwardly directed extensions 13. Secured to the shaft 10 adjacent to the bearing 12 are a plurality of pulleys 14 around which a belt is adapted to pass, which belt may be passed around similar pulleys on a machine of any kind or class, and mounted upon the shaft 10 is my improved reversing mechanism 15.

The reversing mechanism comprises a hollow or tubular pulley wheel 16 around which a belt from a motor or other source of power is adapted to pass, one side of the pulley 16 is closed by a plate 17 through which the shaft 10 passes, said plate being provided on its inner face with a beveled gear 18 and in its outer face with an annular recess 19, and the plate 17 as well as the gear 18 thereof is rigidly secured to the pulley 16 and rotates therewith. A disk 20 is mounted upon the shaft 10 and free to rotate thereon, said disk being provided on its inner face with a beveled gear 21 and in its outer face with an annular recess 22, in other words, the disk 20 is of the same general construction as the plate 17 but is independent of the pulley 16.

Secured in connection with the bearing 11 is a drum 23 which extends into the pulley 16. as clearly shown in Fig. 2 of the drawing, and that part of the drum 23 outwardly of the pulley 16 is cut out at one side as shown at 24 to permit of the operation of certain mechanisms therein as will be apparent.

That portion of the drum 23 within the pulley 16 is provided with a central hub or bearing portion 25 joined with the drum by a web structure 26, and the shaft 10 passes through the bearing 25 and is free to rotate therein, and two radially arranged stub shafts 27 and 28 are adapted to rotate in the drum 23, the inner ends thereof operating in the bearing 25 as shown in Fig. 2 of the drawing and beveled gears 29 and 30 are secured to said shafts 27 and 28 respectively, and said gears mesh with the beveled gears 18 and 21 as clearly shown in Fig. 2 of the drawing.

Secured to the shaft 10 within the drum 23 and outwardly of the disk 20 is a friction ring or clutch member 31 shown in detail in Fig. 5 of the drawing, and a similar clutch member 31 is secured to the shaft 10 outwardly or to the left of the pulley 16, and said clutch members are adapted to operate in connection with annular recesses 19 and 22 of the plate 17 and disk 20 respectively, as hereinafter set out.

The clutch members 31 are both of the same general form and construction and comprise a central hub portion 32 through which the shaft 10 passes, and by means of which said clutch members are secured to said shaft, said head being provided with oppositely and radially directed arms 33, each of which is provided with a semi-circular clutch segment 34 which cooperate to form a substantially ring-shaped clutch member 31, and the end portions of the segments 34 are provided with outwardly directed projections 35 extending at right angles to the segments 34, and in connection with which operating levers 36 are adapted to operate. The levers 36 are rotatably mounted upon pins 37 secured to the arms 33 of the clutch members 31, said levers being provided at one end with cam-shaped heads 38 which are adapted to operate upon the projections 35 to spring the segments 34 outwardly into firm engagement with the walls of the annular recesses 19 and 22. The other end portions of the levers 36 are arc-shaped in form and provided with heads 39 in which are mounted adjustable pins 40 which operate in connection with sleeves 41 and 42 to control the movement of the clutch segments 34 of the separate clutch members 31.

The sleeves 41 and 42 are of the same form and construction but the sleeve 41 is slidably mounted upon the shaft 10 within the drum 23, while the sleeve 42 is slidably mounted upon the shaft 10 to the left of the pulley 16, said sleeves are provided on their inner ends with beveled faces 43 adapted to cooperate with the pins 40 and the outer end portions of said sleeves are enlarged as shown at 44 and provided with annular grooves 45 adapted to receive fork-shaped members 46 secured to an operating bar or rod 47, said bar or rod being provided with a hand-piece 48 by means of which the same may be operated, or said bar or rod may be operated by any other means, and it will be noted that said bar or rod passes through and operates in the extensions 13 of the bearings 11 and 12.

The operation of my improved reversing mechanism will be readily understood from the foregoing description when taken in connection with the accompanying drawing and the following statement. It will be apparent that the pulley 16 when the motor or other power unit is in operation will be constantly rotated as will also the plate 17 and gear 18, as well as the gear 21 and gears 29 and 30, and if it be desired to rotate the shaft 10 through the gear 21, or the disk 20 thereof, the sleeve 41 is slid longitudinally of the shaft in the direction of the disk 20 and clutch member 31 therein by operating the bar or rod 47, in which operation the beveled face 43 of the sleeve 41 engages the pins 40 and moves said pins radially into the position shown in Figs. 2 and 3, in which operation the levers 36, or the cam faces 38 thereof, operate upon the projections 35 of the clutch segments 34 to expand or move said segments radially into firm engagement with the recess 22 of the disk 20 thus causing the shaft 10 to be rotated through the gear 21 and disk 20. In this operation the sleeve 42 will assume the position shown in Fig. 2, and the plate 17 will revolve freely upon the shaft 10.

If it be desired to rotate the shaft in the opposite direction, the bar or rod 47 will be moved to reverse the position of the sleeve 41—42, or to bring the sleeve 42 in engagement with the pins 40 of the clutch member 31 which operates in connection with the plate 17, or the recess 10 thereof, and the shaft 10 will then be rotated through the gear 18 and plate 17, and the disk 20 and gear 21 will revolve freely upon said shaft.

It will also be apparent that the sleeves 41 and 42 may be moved into a neutral position in which the pulley 16 may rotate without rotating the shaft 10 in any direction, and while I have shown certain details of construction for carrying my invention into effect and have indicated a specific use of my invention, it will be understood that I am not necessarily limited to this use, nor to the details of construction herein shown and described, and various changes therein and modifications thereof may be made, within the scope of the appended claims, without departing from the spirit of my invention or sacrificing its advantages.

Having fully described my invention, what I claim as new and desire to secure by Letters Patent, is:—

1. A reversing mechanism of the class described comprising a drive shaft, a pulley mounted to rotate freely upon said shaft, said pulley being provided at one side thereof with an annular recess, a disk rotatably mounted on said shaft and provided with a corresponding annular recess, a drum extending into said pulley, gears rotatably mounted in said drum and geared in connection with said pulley and said disk and for rotating said disk in an opposite direction to that of said pulley, and clutch devices secured to said shaft and adapted to operate in the recesses of said pulley and disk respectively for controlling the direction of rotation of said shaft.

2. A reversing mechanism of the class described comprising a drive shaft, a pulley mounted to rotate freely upon said shaft, said pulley being provided at one side thereof with an annular recess, a disk rotatably mounted on said shaft and provided with a corresponding annular recess, a drum extending into said pulley, gears rotatably mounted in said drum and geared in connection with said pulley and said disk and for rotating said disk in an opposite direction to that of said pulley, clutch devices secured to said shaft and adapted to operate in the recesses of said pulley and disk respectively for controlling the direction of rotation of said shaft, and means movably mounted on said shaft and independent of said clutch devices for moving the same into operative position.

3. A reversing mechanism of the class described comprising a drive shaft, a pulley mounted to rotate freely upon said shaft, said pulley being provided at one side thereof with an annular recess, a disk rotatably mounted on said shaft and provided with a corresponding annular recess, a drum extending into said pulley, gears rotatably mounted in said drum and geared in connection with said pulley and said disk and for rotating said disk in an opposite direction to that of said pulley, clutch devices secured to said shaft and adapted to operate in the recesses of said pulley and disk respectively for controlling the direction of rotation of said shaft, means movably mounted on said shaft and independent of said clutch devices for moving the same into operative position, and means slidably mounted on said shaft and independent of said last named means and adapted to cooperate therewith for controlling the operation of said clutch devices.

4. A reversing mechanism of the class described, comprising a drive shaft, a pulley mounted to rotate freely upon said shaft, said pulley being provided at one side thereof with an annular recess, a disk rotatably mounted on said shaft and provided with a corresponding recess, a tubular member extending into said pulley, gears rotatably mounted in connection with said member, said pulley and disk being provided with gear faces in connection with which said first named gears are adapted to operate for rotating the disk in an opposite direction to that of said pulley, clutch devices secured to said shaft and mounted in the recesses of said pulley and disk respectively and normally disengaged therefrom, said clutch devices each comprising cam-shoes adapted to be expanded radially into contact with said pulley and said disk, whereby said shaft may be rotated in a predetermined direction through either said pulley or said disk, and means movably mounted on said shaft and in operative connection with the cam-shoes of said clutch devices for moving the same into operative position.

5. A reversing mechanism of the class described, comprising a drive shaft, a pulley mounted to rotate freely upon said shaft, said pulley being provided at one side thereof with an annular recess, a disk rotatably mounted on said shaft and provided with a corresponding recess, a tubular member extending into said pulley, gears rotatably mounted in connection with said member, said pulley and disk being provided with gear faces in connection with which said first named gears are adapted to operate for rotating the disk in an opposite direction to that of said pulley, clutch devices secured to said shaft and mounted in the recesses of said pulley and disk respectively and normally disengaged therefrom, said clutch devices each comprising cam-shoes adapted to be expanded radially into contact with said pulley and said disk, whereby said shaft may be rotated in a predetermined direction through either said pulley or said disk, means movably mounted on said shaft and in operative connection with the cam-shoes of said clutch devices for moving the same into operative position, and manual means for operating said last named means.

6. A reversing mechanism of the class described, comprising a drive shaft, a pulley mounted to rotate freely upon said shaft, said pulley being provided at one side thereof with an annular recess, a disk rotatably mounted on said shaft and provided with a corresponding recess, a tubular member extending into said pulley, gears rotatably mounted in connection with said member, said pulley and disk being provided with gear faces in connection with which said first named gears are adapted to operate for rotating the disk in an opposite direction to that of said pulley, clutch devices secured to said shaft and mounted in the recesses of said pulley and disk respectively and normally disengaged therefrom, said clutch devices each comprising cam-shoes adapted to be expanded radially into contact with said pulley and said disk, whereby said shaft may be rotated in a predetermined direction through either said pulley or said disk, levers pivotally mounted in connection with the seperate clutch devices and in operative connection with the cam-shoes thereof, and manually operated sleeves movably mounted on said shaft and adapted to actuate said levers to move said cam-shoes into operative positions.

In testimony that I claim the foregoing as my invention I have signed my name this 15th day of October 1921.

GIORDANO ZILOCCKI.